US006588549B2

(12) United States Patent
Wike, Jr. et al.

(10) Patent No.: US 6,588,549 B2
(45) Date of Patent: Jul. 8, 2003

(54) CHECKOUT SYSTEM CONVERTIBLE BETWEEN ASSISTED AND NON-ASSISTED CONFIGURATIONS

(75) Inventors: Charles K. Wike, Jr., Sugar Hill, GA (US); Jennifer I. Nugent, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/900,286

(22) Filed: Jul. 6, 2001

(65) Prior Publication Data

US 2003/0006098 A1 Jan. 9, 2003

(51) Int. Cl.[7] ............................ A47F 9/04; G06K 15/00
(52) U.S. Cl. .......................................... 186/61; 235/383
(58) Field of Search ..................... 186/61, 52; 235/383, 235/462.45, 472.01

(56) References Cited

U.S. PATENT DOCUMENTS

| | | | | |
|---|---|---|---|---|
| 3,688,873 A | | 9/1972 | Potrafke | |
| 3,725,895 A | | 4/1973 | Haynes | |
| 4,138,000 A | * | 2/1979 | Hartup | 186/59 |
| 4,618,032 A | | 10/1986 | Woolf | 186/61 |
| 4,676,343 A | | 6/1987 | Humble et al. | |
| 4,775,782 A | * | 10/1988 | Mergenthaler et al. | 186/61 |
| 4,779,706 A | | 10/1988 | Mergenthaler | |
| 4,789,048 A | | 12/1988 | Cramer et al. | |
| 4,792,018 A | | 12/1988 | Humble et al. | |
| 4,947,028 A | | 8/1990 | Gorog | |
| 4,971,177 A | | 11/1990 | Nojiri et al. | |
| 5,083,638 A | | 1/1992 | Schneider | |
| 5,115,888 A | | 5/1992 | Schneider | |
| 5,174,413 A | | 12/1992 | Cappi et al. | |
| 5,250,789 A | | 10/1993 | Johnsen | |
| 5,316,107 A | | 5/1994 | Wieschemann et al. | |
| 5,375,680 A | | 12/1994 | Ikeda et al. | |
| 5,378,860 A | | 1/1995 | Dingfelder et al. | |
| 5,412,191 A | | 5/1995 | Baitz et al. | |
| 5,424,524 A | | 6/1995 | Ruppert et al. | |
| 5,426,282 A | | 6/1995 | Humble | |
| 5,434,394 A | | 7/1995 | Roach et al. | |
| 5,437,346 A | | 8/1995 | Dumont | |
| 5,478,989 A | | 12/1995 | Shepley | |
| 5,492,199 A | * | 2/1996 | Shimoyama | 186/61 |
| 5,494,136 A | | 2/1996 | Humble | |
| 5,497,853 A | | 3/1996 | Collins, Jr. et al. | |
| 5,543,607 A | | 8/1996 | Watanabe et al. | |
| 5,544,040 A | | 8/1996 | Gerbaulet | |

(List continued on next page.)

FOREIGN PATENT DOCUMENTS

| | | |
|---|---|---|
| EP | 0396218 | 11/1990 |
| EP | 1098281 | 5/2001 |

*Primary Examiner*—Kathy Matecki
*Assistant Examiner*—Sang Kim
(74) *Attorney, Agent, or Firm*—Maginot, Moore & Bowman LLP; Paul W. Martin

(57) ABSTRACT

A checkout system and method is convertible between an assisted configuration or mode of operation and a non-assisted (self-assisted) configuration or mode of operation. The checkout system includes a checkout station having a movable scanner and a movable display each of which are selectively positionable to accommodate the assisted and non-assisted configurations. The checkout station also includes a customer bag well particularly for use by the customer when the checkout station is in a non-assisted mode of operation, a cashier bag well particularly for use by the cashier when the checkout station is in an assisted mode of operation, a merchandise placement or upload area, a payment module, and a walk through basket table, shelf or the like. A plurality of checkout stations is positioned or angled into a modified serial (staggered skew) configuration and are scalable.

20 Claims, 10 Drawing Sheets

U.S. PATENT DOCUMENTS

| | | | |
|---|---|---|---|
| 5,560,450 A | 10/1996 | Kouno | |
| 5,609,223 A | 3/1997 | Iizaka et al. | |
| 5,662,190 A | 9/1997 | Abe | |
| 5,684,289 A | 11/1997 | Detwiler et al. | |
| 5,708,782 A | 1/1998 | Larson et al. | |
| 5,747,784 A | 5/1998 | Walter et al. | |
| 5,752,582 A | 5/1998 | Hayward | |
| 5,832,457 A | 11/1998 | O'Brien et al. | |
| 5,845,259 A | 12/1998 | West et al. | |
| 5,845,263 A | 12/1998 | Camaisa et al. | |
| 5,884,281 A | 3/1999 | Smith et al. | |
| 5,884,728 A | 3/1999 | D'Estaintot et al. | |
| 5,886,336 A | 3/1999 | Tang et al. | |
| 5,890,135 A | 3/1999 | Powell | |
| 6,047,889 A | 4/2000 | Williams et al. | |
| 6,055,573 A | 4/2000 | Gardenswartz et al. | |
| 6,105,867 A | 8/2000 | Shimizu et al. | |
| 6,189,790 B1 * | 2/2001 | Walter | 186/61 |
| 6,213,395 B1 * | 4/2001 | Dejaeger et al. | 186/61 |

* cited by examiner

FIG. 8
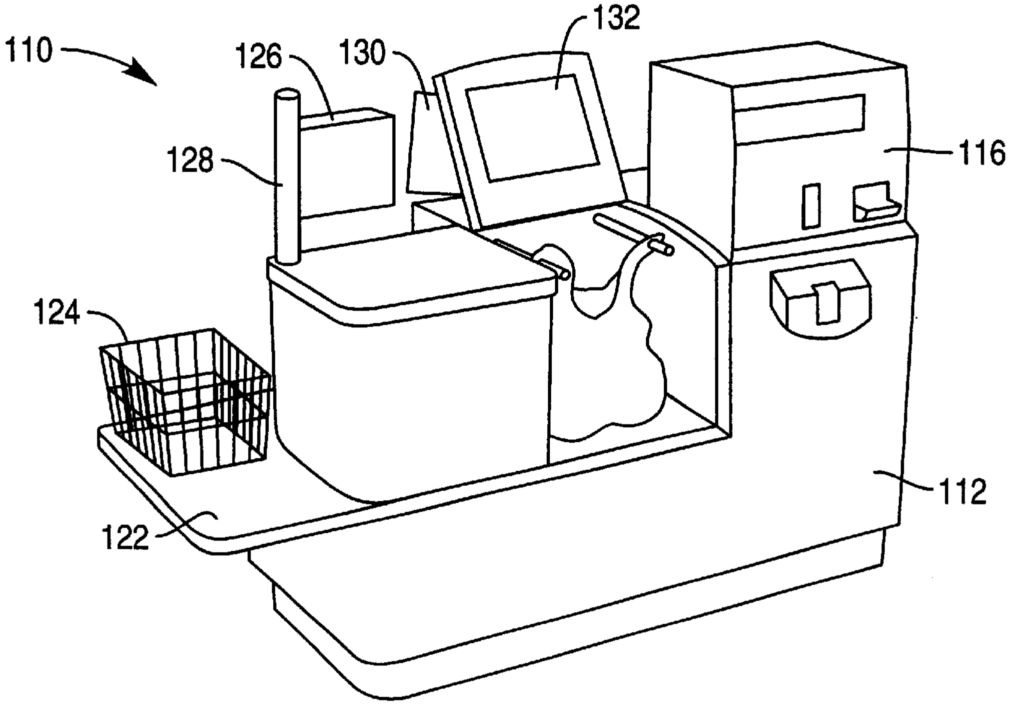
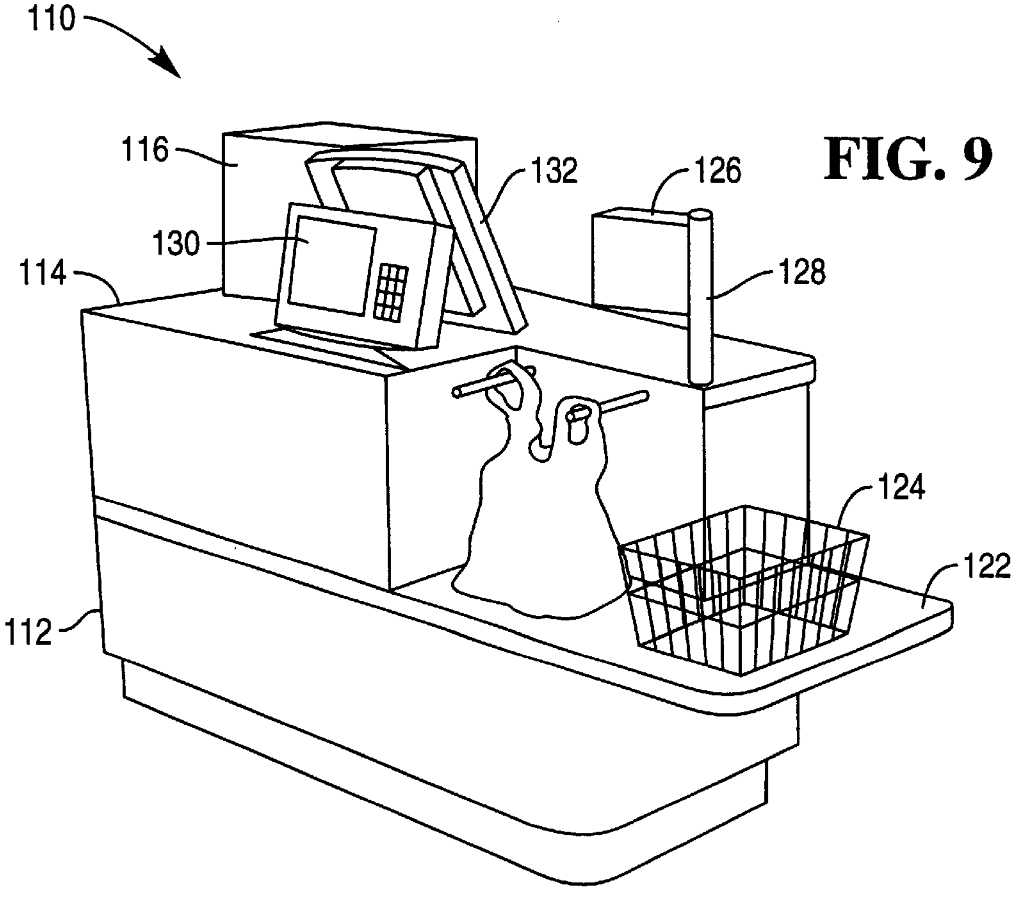
FIG. 9

CHECKOUT SYSTEM CONVERTIBLE BETWEEN ASSISTED AND NON-ASSISTED CONFIGURATIONS

FIELD OF THE INVENTION

The present invention relates generally to checkout station configurations that are convertible and, more particularly, to an apparatus, method, and system allowing selectable conversion and scaleable configuration of multiple checkout stations, providing either or both of self-assisted checkout and assisted checkout capabilities.

BACKGROUND

In a retail store such as a drugstore, for example, customer volume at checkout stations varies depending on the time of day, day of week, special promotions, weather, and other reasons. In order to efficiently manage a retail store, a number of checkout stations that are active and have a store employee functioning as a checkout operator will conventionally vary depending on anticipated customer volume for different times.

In a conventional drugstore checkout configuration, multiple checkout stations are either configured in a known 'supermarket' layout having parallel lanes (a parallel checkout configuration), or they are configured to have individual checkout stations along, for example, a counter (a serial checkout configuration). In the single counter configuration, the counter serves to demarcate and provide a secure employee area. The secure employee area is thus defined behind the counter such that a customer area is defined at the front of the counter. The secure employee area serves for making cash "drops" into a register or a safe, for stocking and dispensing controlled goods such as alcohol and cigarettes, and for other purposes.

In any of the conventional checkout configurations for any type of store, it has become difficult to maximize throughput and to manage the variability of store traffic and employee availability. For example, if a store manager knows that her store is typically very busy during Friday evening hours, the manager may provide for having a large number of checkout employees at work during those peak period hours. In the event of one or more checkout employees being absent from work, the checkout employees who are present will be required to forego taking breaks, employees who are unfamiliar with checkout operations may be required to man a checkout station, or the amount of time a customer must wait in line becomes excessive.

In another example, a store manager may have hired additional checkout employees for a known peak-volume period only to encounter a weather condition such as cold temperatures that inhibits customers from shopping at that time. Other similar examples can easily be envisioned, where the conventional checkout configurations are inefficient because they are not adaptable to unseen events and conditions.

Certain stores such as drugstores may have additional logistical considerations such as having a limited amount of floor space. Generally, more floor space equates to the ability to sell more goods, provide for a more comfortable shopping environment, and/or the like. Implementation of the above-mentioned 'counter' or 'serial' type checkout configuration generally requires less square footage than for the 'supermarket' or 'parallel' type checkout configuration. The "footprint," an outline and floor surface area occupied by a checkout station's equipment and by the checkout station's related surfaces such as for a merchandise placement area and/or a bagging area, should, therefore, be minimized. Thus, most drugstores, convenience stores, and the like with limited floor space or other considerations, other than 'superstores' use a counter or serial type checkout configuration.

To aid in the understanding of the present invention, a conventional counter or serial type checkout configuration is illustrated by way of example in FIG. 1. A conventional counter or serial type checkout system 1 includes a counter 10 and multiple checkout stations 2 disposed primarily on a top surface of the counter 10. Each of the checkout stations 2 includes a checkout terminal/display 4, a universal product code (UPC) barcode scanner 5, a bagging area 6, and a merchandise placement area 7. The conventional counter type checkout system 1 also includes an exit lane 20 that a customer uses to walk to the store's exit after the customer's checkout activities have been completed.

It can be appreciated from the foregoing that a conventional counter or serial type checkout configuration is not scaleable or optimized/optimizable for efficient use of store and/or employee resources.

Recently, self-checkout stations have been developed that reduce a store's dependency on a projection of when additional checkout personnel will be needed. One example of these recently developed checkout stations includes a checkout station for parallel type checkout configurations that is convertible from a self-checkout or non-assisted mode to a cashier-checkout or assisted mode, particularly the NCR Self-Checkout C-Series station from NCR Corporation of Dayton, Ohio. The NCR Self-Checkout C-Series station has a scanner/scale console or cabinet that is entirely removable from the checkout station assemblage, through casters or the like. The entire scanner/scale console is rotatable and replaced into the checkout station assemblage such that the scanner/scale is changed in orientation from a customer-usable scanner/scale to a cashier-usable scanner/scale. The scanner/scale console further has a cashier display that is rotatable for proper customer or cashier orientation. However, as can be appreciated, these currently developed convertible checkout stations and conventional self-checkout stations are laborious to convert, require a large amount of floor space, and thus are impractical for smaller retail stores such as drugstores.

SUMMARY

The present invention is a system, method, and apparatus that provides selectable conversion and scaleable configuration of multiple checkout stations, allowing either or both of self-assisted checkout and assisted checkout. The multiple checkout stations are arranged in a modified serial or staggered angle or skew configuration relative to a linear walkway adjacent the checkout stations.

In one form, the present invention is a checkout station. The checkout station comprises a housing, a scanner, a first display, and a second display. The housing includes a counter. The scanner is movably mounted relative to the counter and has a scanning face operative to scan indicia, a first position wherein the scanning face has a first orientation corresponding to one of an assisted mode of operation and a self-assisted mode of operation, and a second position wherein the scanning face has a second orientation corresponding to the other of the assisted mode of operation and the self-assisted mode of operation, the scanner being selectively movable between the first and second positions. The first display is mounted on the counter and has a display face operative to display purchase transaction information to a clerk during the assisted mode of operation. The second display is mounted on the counter and has a display face operative to display purchase transaction information to a customer during the self-assisted mode of operation, a first position wherein the display face has a first orientation corresponding to one of the self-assisted mode of operation and the assisted mode of operation, and a second position wherein the display face has a second orientation corresponding to the other of the self-assisted mode of operation and the assisted mode of operation, the second display being selectively movable between the first and second positions.

In another form, the present invention is a system having a plurality of checkout stations disposed along a single, serial flow lane, wherein each checkout station is operative to perform purchase transactions and being convertible between a self-checkout configuration and an assisted checkout configuration.

In a further form, the present invention is a checkout system that includes a single serial flow lane and a plurality of checkout stations adjacent said single serial flow lane. Each checkout station includes a rotatable scanner, a customer display, and a clerk display. Each checkout station is convertible between an assisted configuration and a self-assisted configuration, wherein conversion of any one of the plurality of checkout stations comprises rotating the rotatable scanner from a first position to a second position, and selective activation of the customer display and the clerk display. Each one of the plurality of checkout stations defining a longitudinal axis and wherein the longitudinal axis of each checkout station is skewed relative to the single serial flow lane.

In yet another form, the present invention is a method of checkout. The method includes the steps of: (a) providing a plurality of convertible checkout stations, each convertible checkout station operative to perform a purchase transaction and including a rotatable scanner, each convertible checkout station being convertible between an assisted configuration and a self-assisted configuration, wherein conversion of any one of the plurality of convertible checkout stations comprises rotating the rotatable scanner from a first position to a second position, the plurality of convertible checkout stations defining a front and a rear; (b) providing a single serial flow lane adjacent the front of each one of the plurality of convertible checkout stations for serial access to and from the plurality of convertible checkout stations, the single serial flow lane defining a longitudinal axis; and (c) angling the front of each convertible checkout station relative to the longitudinal axis.

BRIEF DESCRIPTION OF THE DRAWING

The above-mentioned and other features and advantages of this invention, and the manner of attaining them, will become more apparent and the invention will be better understood by reference to the following descriptions of embodiments of the invention taken in conjunction with the accompanying figures, wherein:

FIG. 8 is a front (assisted checkout side) perspective view of an embodiment of a checkout station;

FIG. 9 is a rear (cashier-checkout side) perspective view of the checkout station of FIG. 8;

Corresponding reference characters indicate corresponding parts throughout the several views.

DETAILED DESCRIPTION

Figure 1:
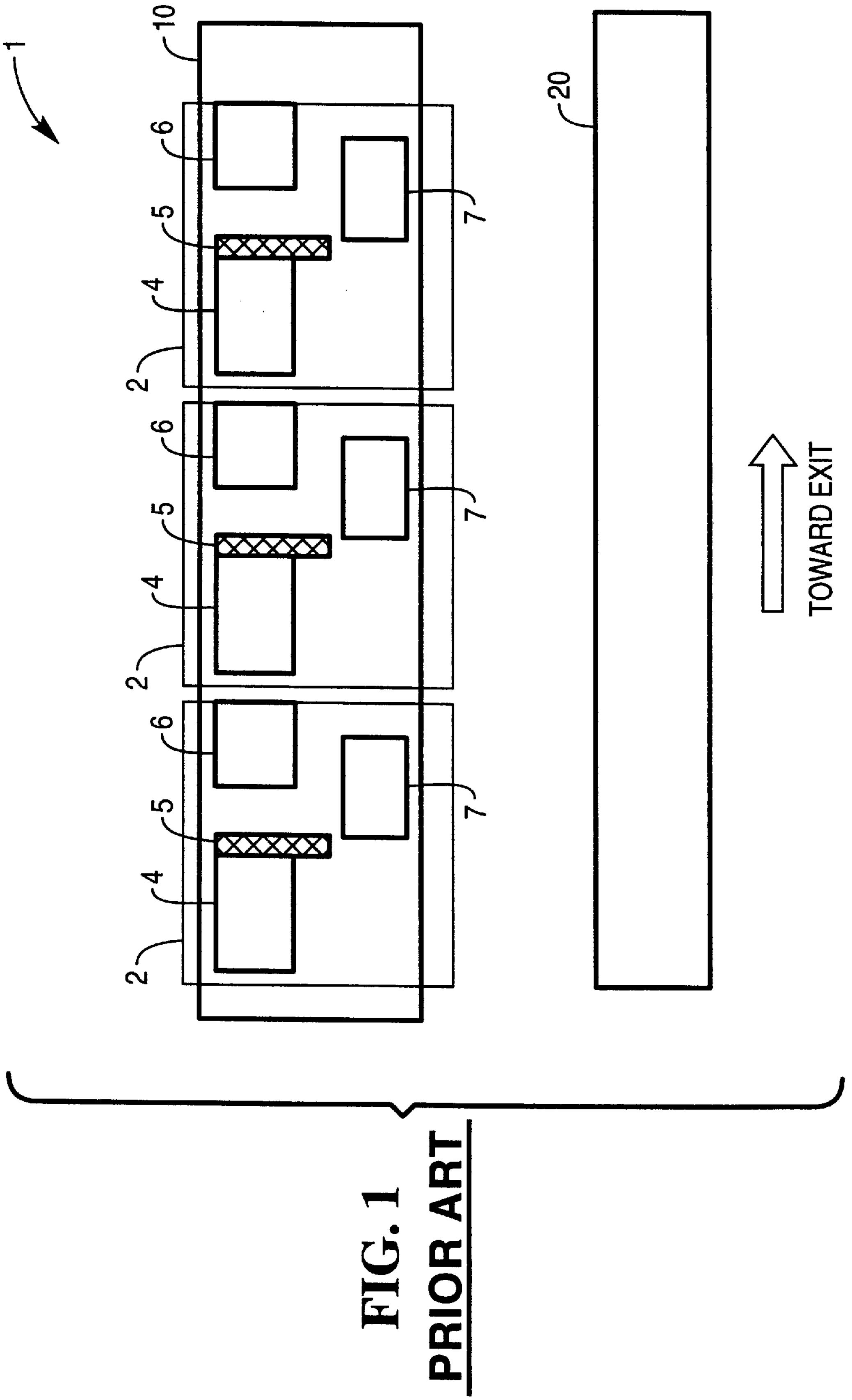
FIG. 1 PRIOR ART
FIG. 1 is a top plan view block illustration of a prior art or conventional counter or serial type checkout configuration.
Figure 2:
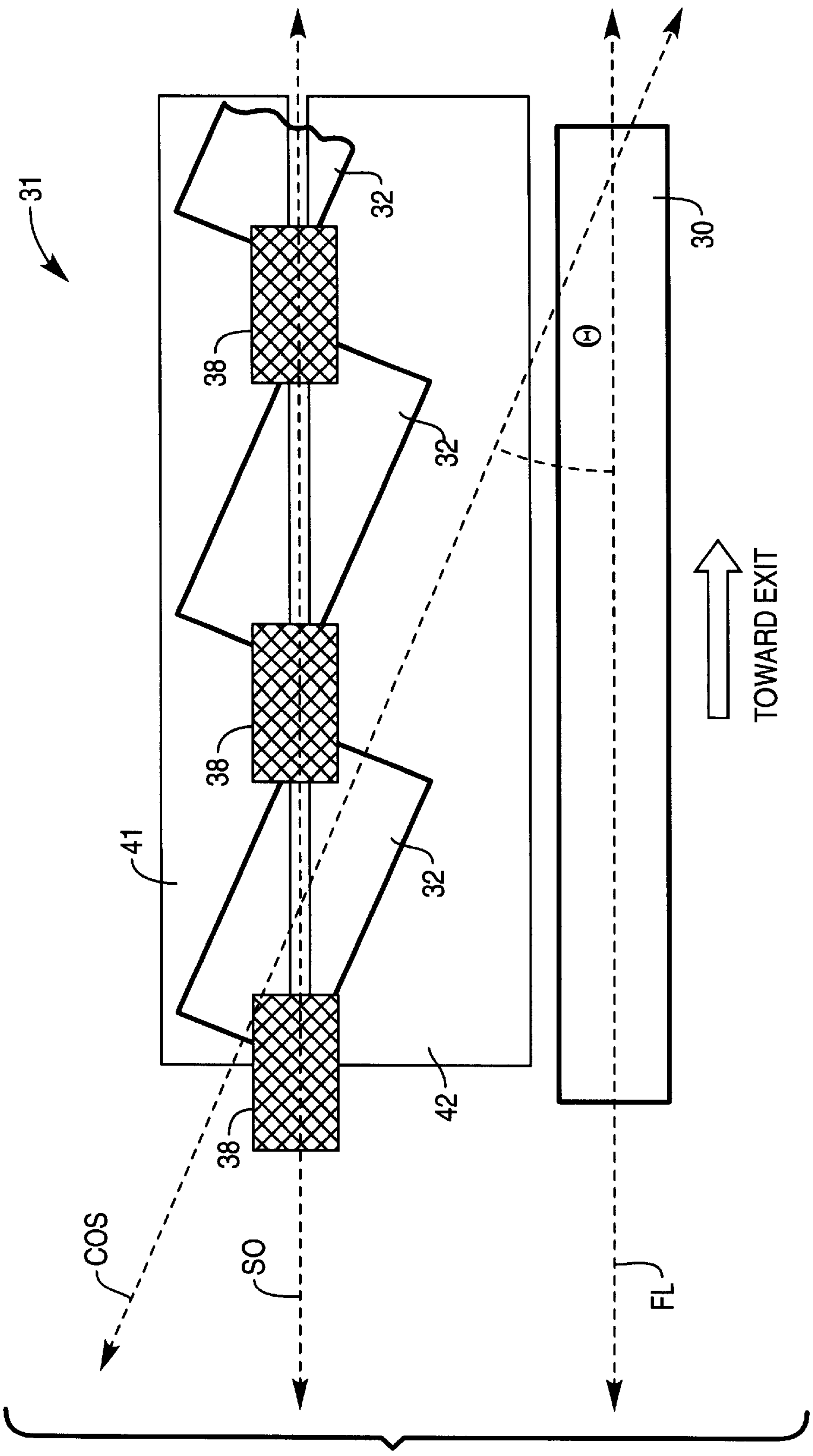
FIGS. 2 and 2A each depict a top plan view block illustration of a modified serial type checkout configuration in accordance with the principles of the present invention.
Figure 2A:
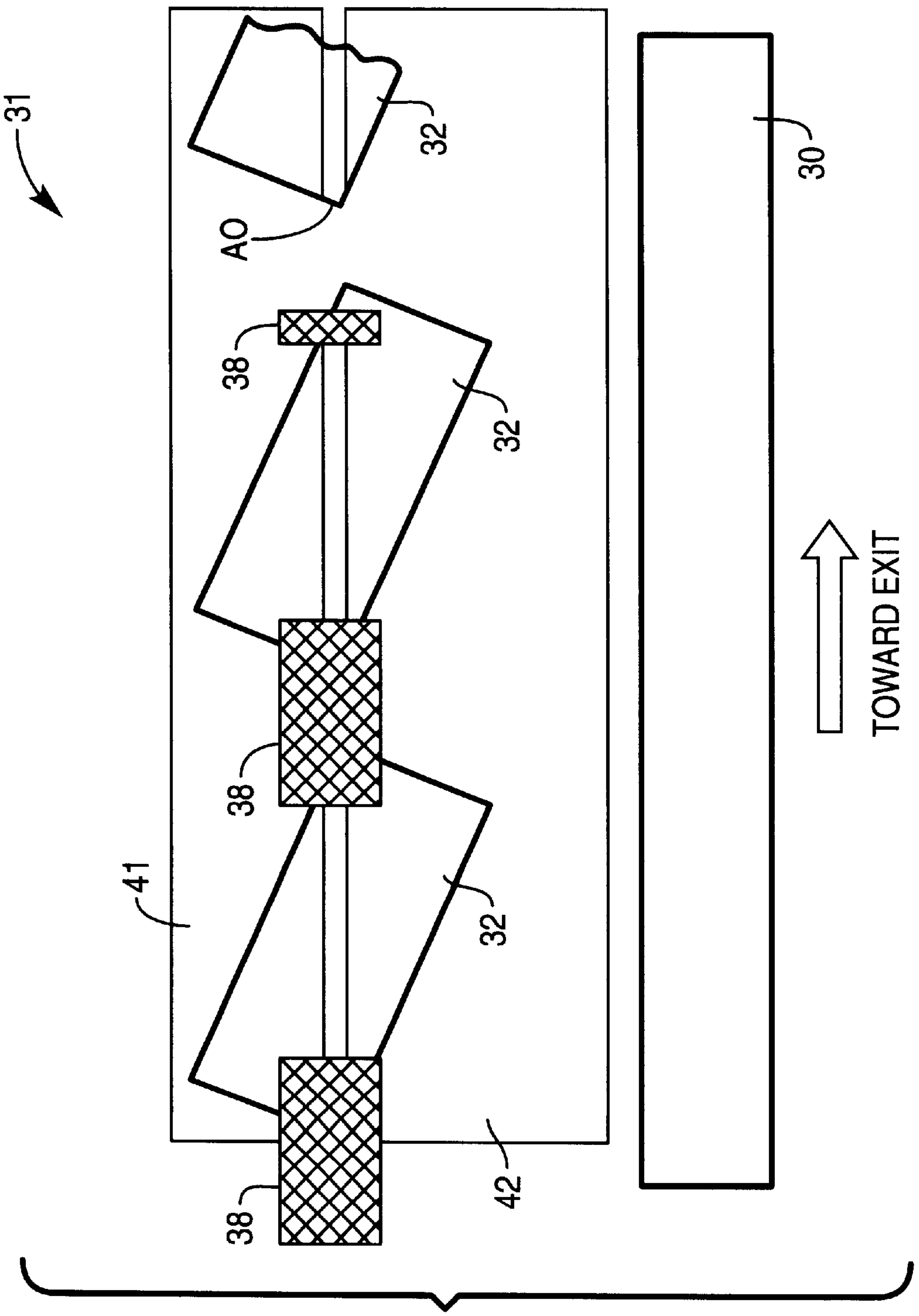

FIGS. 2 and 2A illustrate an exemplary embodiment of a system 31 of convertible checkout stations 32. In accordance with an aspect of the present invention, the checkout stations 32 are arranged in an angled, skewed, staggered skew, or a modified serial configuration relative to a longitudinal and/or linear centerline or pathway 30 of the system 31. The pathway 30 defines an exit lane that a customer uses to walk to the store's exit after the customer's checkout activities have been completed. The pathway 30 defines a flow lane axis FL as shown in FIG. 2. Each of the plurality of checkout stations 32 defines a checkout station axis COS as shown in FIG. 2. Moreover, each of the plurality of checkout stations 32 are skewed relative to the pathway 30 such that the flow lane axis FL and the checkout station axis COS define an angle $\Theta$, where $\Theta$ is preferably about 25° as shown in FIG. 2. A walk-through table or basket shelf 38 is disposed between each adjacent pair of checkout stations 32. The basket shelf 38 defines a shelf orientation axis SO as shown in FIG. 2. The basket shelf 38 is positioned relative to the pathway 30 such that the flow lane axis FL and the shelf axis SO are parallel to each other as shown in FIG. 2. The walk-through table/basket shelf 38 doubles as a walk-through control table for a store's personnel and as a basket shelf for use by customers. The walk-through table/basket shelf 38 may be connected to one of the convertible checkout stations 32 by a hinged mechanism (not shown), so that the walk-through table/basket shelf 38 is able to be lifted at one end, thereby allowing a checkout employee to pass from the rear side 41 of the checkout system 31 to the front side 42 next to the pathway 30. In particular, as shown in FIG. 2A, the basket shelf 38 is movable between (i) a first position in which the basket shelf 38 creates a barrier between the store personnel side 41 of the checkout station 32 and the customer side 42 of the checkout station 32, and (ii) a second position in which an access opening AO is created between the store personnel side 41 of the checkout station 32 and the customer side 42 of the checkout station 32. In the typical configuration, the rear side 41 is where a cashier or store employee stands, while the front side 42 is where a customer stands.

The exemplary configuration of FIG. 2 involves angling the checkout stations 32 in a 'saw tooth' type arrangement, creating a diamond shape appearance relative to the single, linear walkway or pathway 30 that is adjacent the checkout stations 32. Customers utilize the linear pathway 30 as a queue for the checkout stations 32. By angling or skewing a corner of each of the convertible checkout stations 32 toward the pathway 30 (relative to a centerline dividing the front side 42 and the rear side 41 that is substantially parallel to the linear pathway 30), each individual convertible checkout station 32 is more readily identified. The present configuration helps to eliminate a conventional problem where queue of customers spread out around a checkout station, which, when this occurs, makes one unsure which of several checkout lines they are in. Such a modified serial configuration of the present invention also is advantageous for other reasons.

Optionally, a 'next customer' display (not shown) may be utilized to further organize a line of customers waiting to checkout their purchases. The next customer display displays the number of the next available convertible checkout station 32. In such a configuration, each checkout station 32 includes a number sign (not shown) attached to the convertible checkout station 32 in a manner that allows the particular station's unique number to be highly visible when viewed from any direction. The next customer display updates the currently available checkout station indication by obtaining a signal when a previous transaction at a convertible checkout station 32 has been completed.

In accordance with an aspect of the present invention, each of the convertible checkout stations 32 is convertible between an assisted mode of operation and a self-checkout or unassisted mode of operation. The assisted mode of operation permits a cashier standing at the rear side 41 of the checkout station 32 to operate the checkout station 32. The self-checkout mode of operation permits a customer standing at the front side 42 of the checkout stations 32 to operate the checkout station 32.

Figure 3:
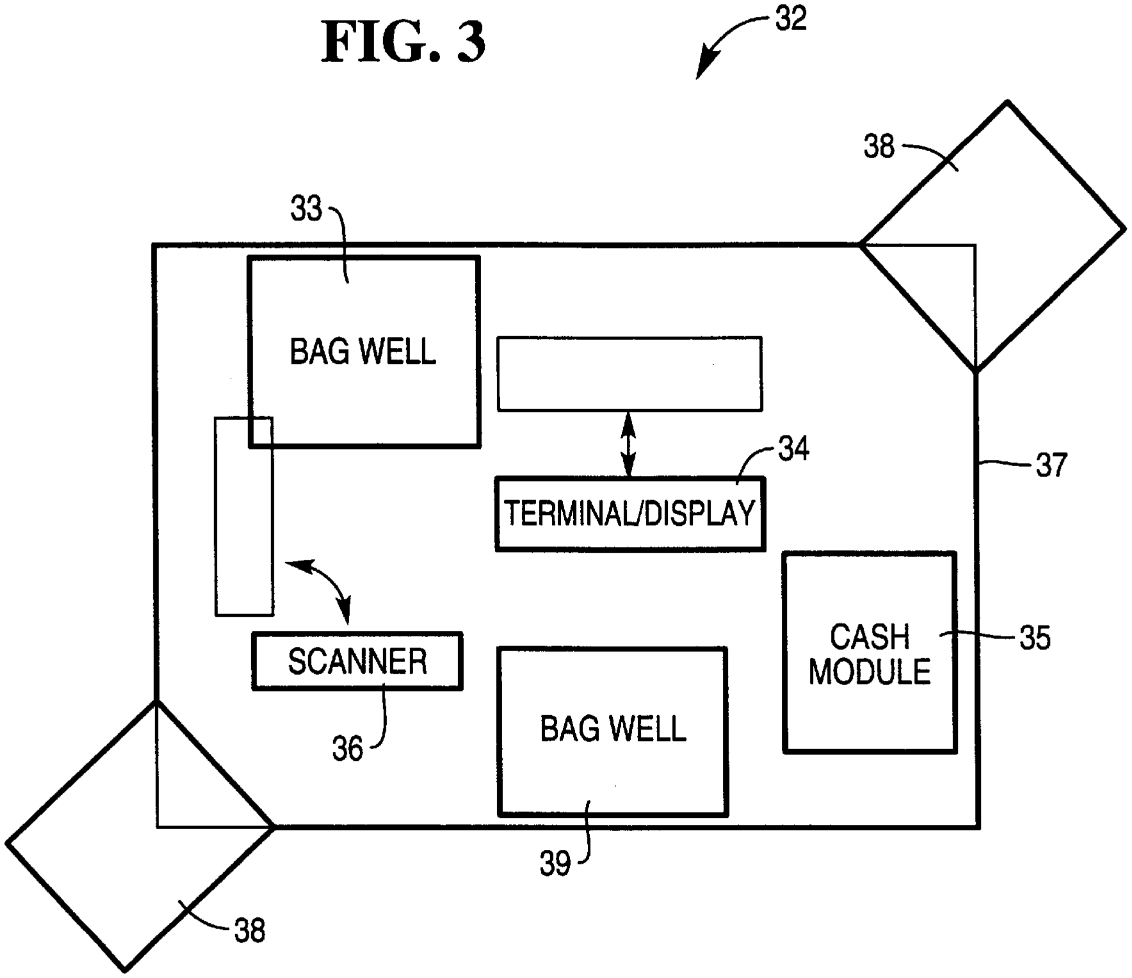
FIG. 3 is top plan view block illustration of a convertible checkout station in accordance with the principles of the present invention that is utilizable with the configuration of FIG. 2.

FIG. 3 illustrates an exemplary embodiment of a convertible checkout station 32. The convertible checkout station 32 includes a counter 37 supporting a movable terminal display 34, a movable scanner 36, a cashier bag well 33, a customer bag well, 39, a cash module or modules 35, and walk-through tables/basket shelves 38. Only one table/basket shelf 38 may be provided per checkout station 32 which cooperates with another checkout station 32 and its table/basket shelf 38. The terminal display 34 is movable in a sliding manner as represented by the double-headed arrow shown between two terminal display positions illustrated by the darker box labeled 34 and a lighter box adjacent the double-headed arrow. The two terminal display positions correspond to the assisted mode of operation and the unassisted mode of operation of the checkout station 32. The terminal display 34 may also rotate about a vertical axis in order to present the screen portion of the terminal display 34 either toward the rear side 41 of the front side 42 (see FIG. 2). The scanner 36 is movable in a pivotal manner as represented by the curved double-headed arrow shown between two scanner positions illustrated by the darker box labeled 36 and a lighter box adjacent the curved double-headed arrow. The two scanner positions correspond to the assisted mode of operation and the unassisted mode of operation of the checkout station 32.

The sliding terminal display 34 in an exemplary embodiment is a touch screen type display such as a model 7401 available from NCR Corporation of Dayton, Ohio. The sliding terminal display 34 of the present invention is not, however, limited to touch screen displays, as any device operative to accept customer selections and to display corresponding selection choices may be utilized. A "touch screen display" as used herein refers to a known type of device that utilizes two-way communication with one or more external devices, where the touch screen display obtains display information and displays audio/visual representations based on the display information, and where the touch screen display displays virtual button(s), or their equivalent (i.e. selections), a pressing of the virtual button(s) causing the touch screen display to display information based on the pressing of the virtual button(s). The sliding terminal display 34 is mounted on a slider assembly that allows the sliding terminal display 34 to slide between the two positions, as shown. The terminal display 34 has the touch screen portion facing toward the customer bag well 39 (i.e. the front of the checkout station 32) when the checkout station 32 is in the unassisted or self-checkout mode. In the assisted or cashier-checkout mode, the touch screen portion of the terminal display 34 is facing opposite the customer bag well 39 (i.e. the rear of the checkout station 32).

In an exemplary embodiment, the sliding terminal display 34 is a touch screen display that includes a Pentium class processor, at least 128 MB of RAM memory, an Ethernet LAN module, integrated audio, and a thermal self-service receipt printer (not shown). The exemplary touch screen display presents an intuitive graphical interface that allows the customer to interact with menus activated by the customer pressing the virtual buttons displayed on the touch screen.

The sliding terminal display 34 may also include a card reader (not shown) that accepts information encoded, for example, on a magnetic strip card such as a credit card, debit card, SMART card, flash memory card, and others. The sliding terminal display 34 preferably communicates with the card reader and, via the Ethernet LAN module, with an external computer (not shown) for verification or authorization of a customer purchase according to credit information provided by the external computer in a known Point-of-Sale (POS) operation. The sliding terminal display 34 may optionally be utilized as a full-service automatic teller machine (ATM) that is integrated with the convertible checkout station 32. The card reader may be attached to the sliding terminal display 34 or may be a stand-alone peripheral unit disposed in close proximity to the sliding terminal display 34. The card reader can include a PIN pad (not shown) and/or a signature capture pad (not shown) that allow a customer to enter a security code and/or a signature, respectively, for security purposes. Optionally, the touch screen of the terminal display 34 may provide a PIN pad and/or signature capture area.

The rotating scanner 36 in an exemplary embodiment is a simple single window type scanner such as a model 7880 scanner available from NCR Corporation of Dayton, Ohio. Such a scanner has a smaller footprint compared with a bi-optic type scanner. The rotating scanner 36 is preferably vertically mounted on an assembly that allows the rotating scanner 36 to rotate or pivot 90° as shown in FIG. 3.

The rotating scanner 36 is operative to read a product identification code pattern such as universal product code (UPC) information attached to or printed on the scanned items as a barcode. The rotating scanner 36 includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed by the rotating scanner 36, the scanning light beams scatter off the code and are returned to the rotating scanner 36 where they are collected and detected. The reflected light is then analyzed electronically in order to determine whether the reflected light contains a valid product identification code pattern. If a valid code pattern is present, the product identification code is then converted into pricing information that is then used to determine the cost of the item in a known manner.

Figure 4:
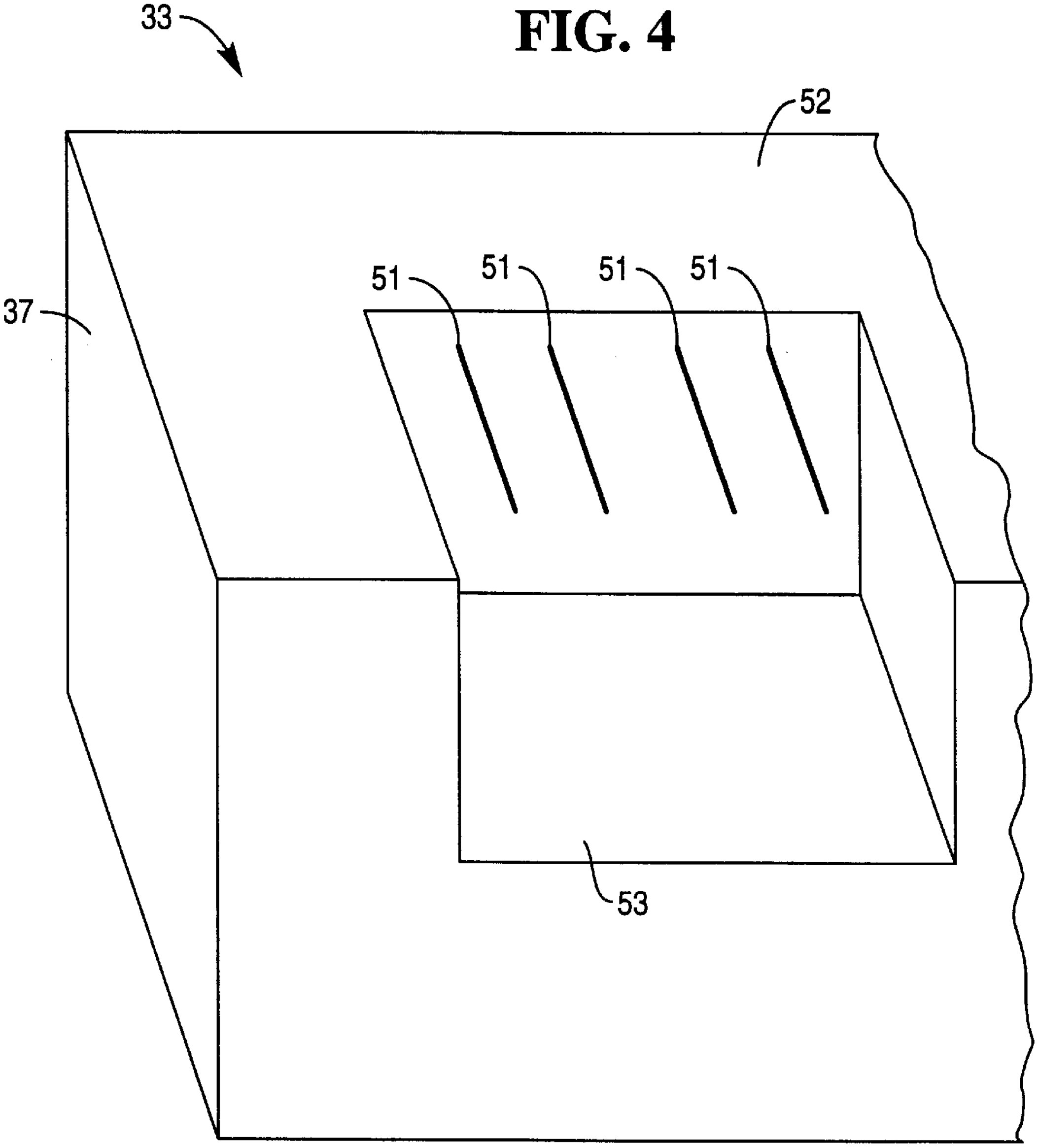
FIG. 4 is a an enlarged perspective view of a bag well portion of the present convertible checkout station.

The cashier bag well 33 is illustrated by way of non-limiting example in FIG. 4. The cashier bag well 33 is disposed in a rear side 41 of the counter 37, proximate the rotating scanner 36. The cashier bag well 33 includes a number of posts 51 which cooperate to support a number of bags (not shown). The posts are positioned substantially horizontally at a level (or levels) below the top surface 52 of the counter 37. The cashier bag well 33 has a lower surface 53 on which an opened bag rests while being filled by the checkout employee. The cashier bag well 33 is configured to allow two or more bags to be accessed by a checkout employee at any given time. In particular, the posts 51 are of a sufficient length to secure a number of unopened bags along with two or more opened bags thereby allowing the checkout employee to selectively load various item types into the bags. For example, the checkout employee may use a first bag for cosmetic items such as soap or shampoo and a second bag for edible items such as candy.

Various configurations of the cashier bag well 33 are contemplated for use in the convertible checkout station 32. More specifically, the configuration of the cashier bag well 33 may be altered to facilitate the incorporation thereof into a specific design of the convertible checkout station 32. For example, the number and orientation of the posts 51 may be altered. For example, two pairs of the posts 51 may be positioned so as to extend inwardly and be opposed to one another.

Figure 5:
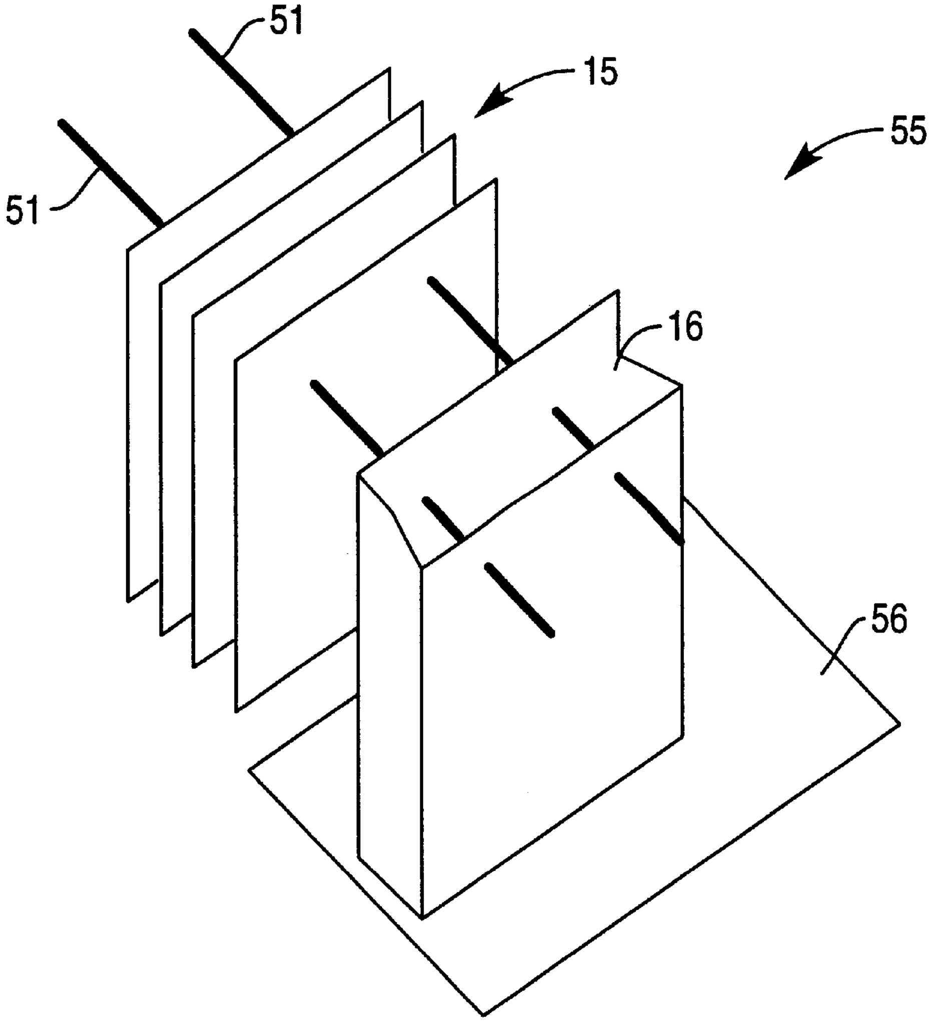
FIG. 5 is a perspective illustration of a manner of providing bags via a bagging apparatus for the present convertible checkout station.

The customer bag well 39 in an embodiment of the present invention may be configured in a manner substantially similar to the cashier bag well 33. Alternatively, the customer bag well 39 can optionally include a bagging apparatus 55 such as that illustrated by way of non-limiting example in FIG. 5. The bagging apparatus 55 includes any number of posts 51 that are of a sufficient length to secure a number of unopened bags 15. The posts 51 also temporarily secure a number of opened bags 16 that are filled by a customer with items that have been scanned using the rotating scanner 36. Although the exemplary embodiment shown in FIG. 5 depicts bags being secured by a pair of rods 51, the present invention is not limited to any particular configuration for the customer bag well 39 and is not limited to a use of two rods 51 for holding one bag.

The bagging apparatus 55 includes one or more security scale(s) 56 for weighing the opened bag(s) 16 as the opened bags are being filled by a customer. The security scale 56 indicates whether something has been removed from or added to the customer's opened bag 16. The security scale 56 outputs weight information for an item placed into or removed from the bag 16, outputs a total weight of the bag 16 and its contents, or outputs an amount of a change in the total weight of the bag 16. The security scale(s) is disposed at a height that allows the opened bag 16 to be accurately weighed without the weighing being affected by the opened bag 16 being temporarily secured to the posts 51. The top surface of the security scale 56 may be coincident with, or may be above the height of a lower surface 53 of the customer bag well 39.

The security scale 56 determines the weight value of an item loaded into the opened bag 16 by detecting a weight increase of the opened bag 16. Alternatively, if a customer removes an item from the opened bag 16, the security scale 56 determines the weight value of the removed item by detecting a weight decrease of the opened bag 16. The security scale 56 may be embodied as any known retail weight scale. One such retail weight scale, which is particularly useful as the security scale 56 of the present invention, is a model number 6680 weight scale that is commercially available from Weigh-Tronix, Incorporated of Santa Rosa, Calif. The use of the security scale 56 provides protection against dishonest customers by comparing a total of the measured weight with a total of stored weight values for all items scanned by the rotating scanner 36. The stored weights values each correspond to a particular item's UPC number. A database (not shown) maintains the weight values for each of the store's items that have a UPC number. The security scale 56 obtains the weight values from the database when an item is scanned.

The cash module(s) 35 in an embodiment of the present invention includes currency and coin acceptors and dispensers (not shown), a coupon acceptor (not shown), a number of media cassettes (not shown), and an optional printer (not shown). The cash module 35 in an exemplary embodiment can be a model 7340 cash module available from NCR Corporation of Dayton, Ohio. The cash module 35 may be disposed on a top surface 52 of the counter 37, or may be positioned at a different height, depending upon the counter 37 style and configuration. The cash module 35 accepts cash payments for a customer's purchases. In an alternative embodiment, the cash module 35 may include the above-described card reader, PIN pad, and/or signature pad, the cash module 35 thereby comprising a POS terminal and/or an ATM together with the currency, coin, and coupon equipment.

The counter 37 has a top surface 52 as well as other essentially parallel surfaces such as the lower surface 53 of the cashier bag well 33, the lower surface 53 of the customer bag well 39, a lower surface (not shown) of the cash module 35, and others. The counter 37 of an exemplary embodiment also includes a rotation base assembly 60 such as that shown in FIG. 6B.

The exemplary rotation base assembly 60 includes a vertically oriented post 66, stopping members 67, 68, and a support 69. The post 66 is a rod having a diameter that allows the post 66 to be inserted into the receptacle 62 of the rotating scanner 36, shown in FIG. 6A, so that the post 66 is able to freely rotate. The stopping members 67, 68 may be disposed in the post 66, and extending a small distance radially from the post 66, while still allowing the post 66 to be freely inserted into the receptacle 62. The post 66 may be keyed (not shown) to match a corresponding keying of the receptacle for ease of installation.

Figure 6A:
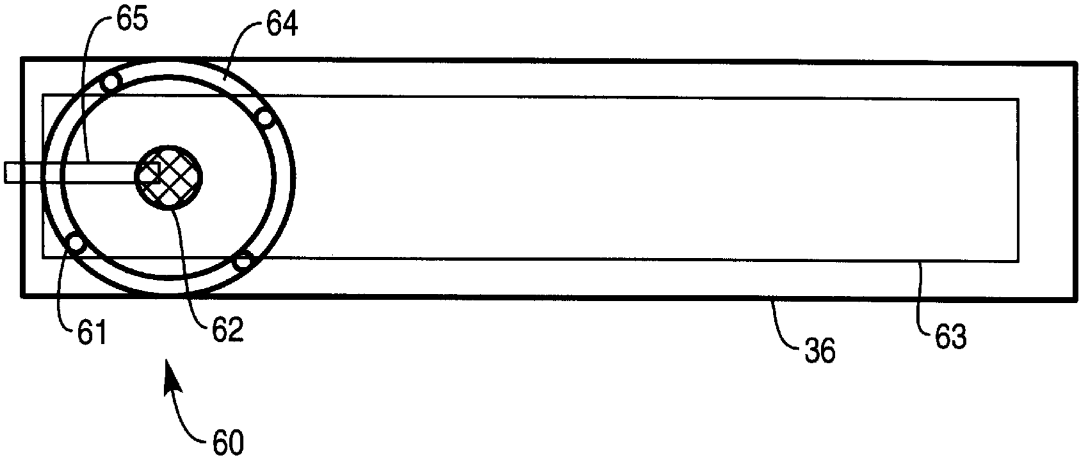
FIG. 6A is an enlarged bottom plan view of the scanner of the present convertible checkout station illustrating an exemplary positioning mechanism for the scanner.
Figure 6B:
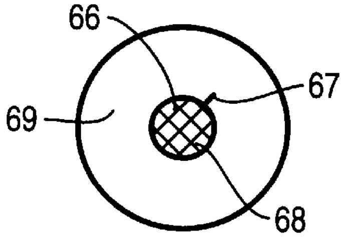
FIG. 6B is an enlarged view of a post assembly of the present convertible checkout station for the scanner.

As shown in the exemplary embodiment of FIG. 6A, the rotating scanner 36 includes the receptacle 62, a lateral support member 63, a latching mechanism 65, and a mounting assembly 64. The lateral support member 63 of the exemplary embodiment is integral with an enclosure of the rotating scanner 36, and is formed so that when the rotating scanner 36 is mounted on the post 66, the lateral support member 63 absorbs all the mechanical torque and stress due to the rotatable mounting. The mounting assembly 64 is secured to the lateral support member 63 of the rotating scanner 36 with a number of fasteners 61, such as screws, bolts, rivets, and others. The latching mechanism 65 in an exemplary embodiment is mounted to extend from the receptacle 62 to an adjacent exterior side of the rotating scanner 36. While FIG. 6A illustrates an exemplary position of the receptacle 62, lateral support member 63, latching mechanism 65, and mounting assembly 64 as being adjacent one end of the rotating scanner 36 for maintaining a 'swing' rotation, the position can be located at any convenient location along the bottom of the rotating scanner 36. For example, in a case where the center of weight distribution of the rotating scanner 36 is a desired location, the position may be located accordingly.

Figure 6C:
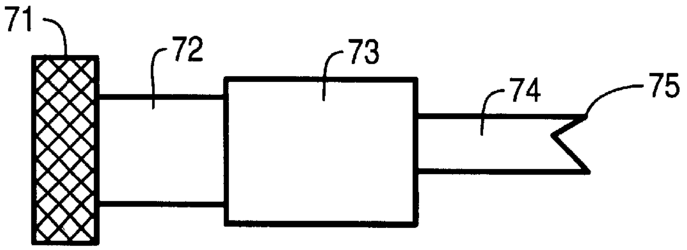
FIG. 6C is an enlarged view of an exemplary latching mechanism for the scanner of the present convertible checkout station.

FIG. 6C illustrates an exemplary embodiment of a latching mechanism 65 The latching mechanism 65 includes a button 71, a first shaft 72, a spring-loaded release mechanism 73, and a second shaft 74 having a latching notch 75 disposed at its distal end. The latching mechanism 65 is operative in an engagement mode and a disengagement mode with respect to the post 66. In the engagement mode the latching mechanism 65 engages the post 66 to prevent rotation of the scanner 36. The engagement mode is the normal mode. In the disengagement mode the latching mechanism is released from engagement with the post 66 to thereby allow rotation of the scanner 36.

It should be appreciated that the rotation or pivot mechanism described above in connection with FIGS. 6A–6C, is only exemplary of a manner in which selective or controlled rotation, swinging, or pivoting of the scanner 36 is achieved. Other mechanisms or manners of achieving is contemplated and encompassed by the terms rotation or pivot mechanism.

While not specifically shown, the terminal display 34 is disposed on a slide mechanism that cooperates with the counter 37. The slide mechanism allows the terminal display 34 to slide to and from an unassisted mode position and an assisted mode position. The terminal display 34 may have only one display face (a touch screen face) disposed along a longitudinal side thereof, or the terminal display 34 may have dual display faces (touch screens) disposed on both longitudinal sides thereof. With only one display face, the slide mechanism also permits the terminal display 34 to pivot or rotate in like manner to the rotation mechanism of the scanner 36. The terminal display 34 is rotated during the conversion process so the display face is presented to either the customer or the cashier depending on the mode (i.e. to the customer in the unassisted/self checkout mode and the cashier in the assisted checkout mode). The terminal display 34 is slidable toward the customer bag well 39 (the customer) when in the unassisted checkout mode/configuration to present the display face to the customer, and toward the rear of the counter 37 (opposite the bag well 39) when in the assisted checkout mode/configuration to present the display face to the cashier.

The walk-through table/basket shelf 38 in an exemplary embodiment is a flat device such as a board, mounted between adjacent counters 37. The walk-through table basket shelf 38 is preferably mounted on hinges to a top surface 52 of one counter 37, so that a checkout employee can lift the walk-through table/basket shelf 38 in order to enter or exit the rear side 41 of the convertible checkout station 32.

It should be appreciated that the various components of the checkout station 32 are operative in like manner to typical retail terminals with regard to processing a purchase transaction. The various components thus have the necessary software, hardware, and interfaces to the other of the various components to perform a purchase transaction, including providing any necessary feedback, such as receipts (paper and/or digital), and the like.

Figure 7:
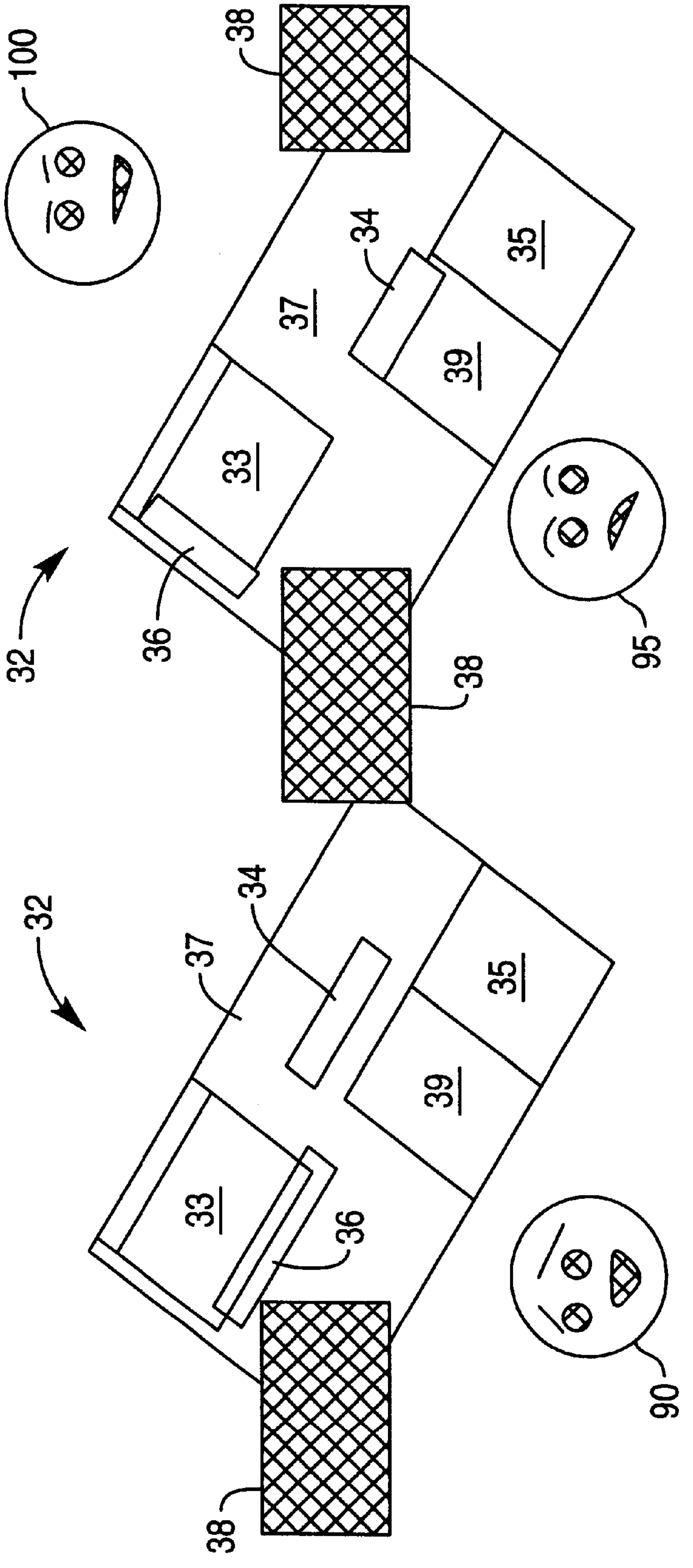
FIG. 7 is a top plan view block illustration of a modified serial or angled/skewed configuration of two convertible checkout stations according to the principles presented herein, with one convertible checkout station configured into a self-checkout or non-assisted checkout mode of operation and with the other convertible checkout station configured into a cashier-checkout or assisted checkout mode of operation.
Figure 10:
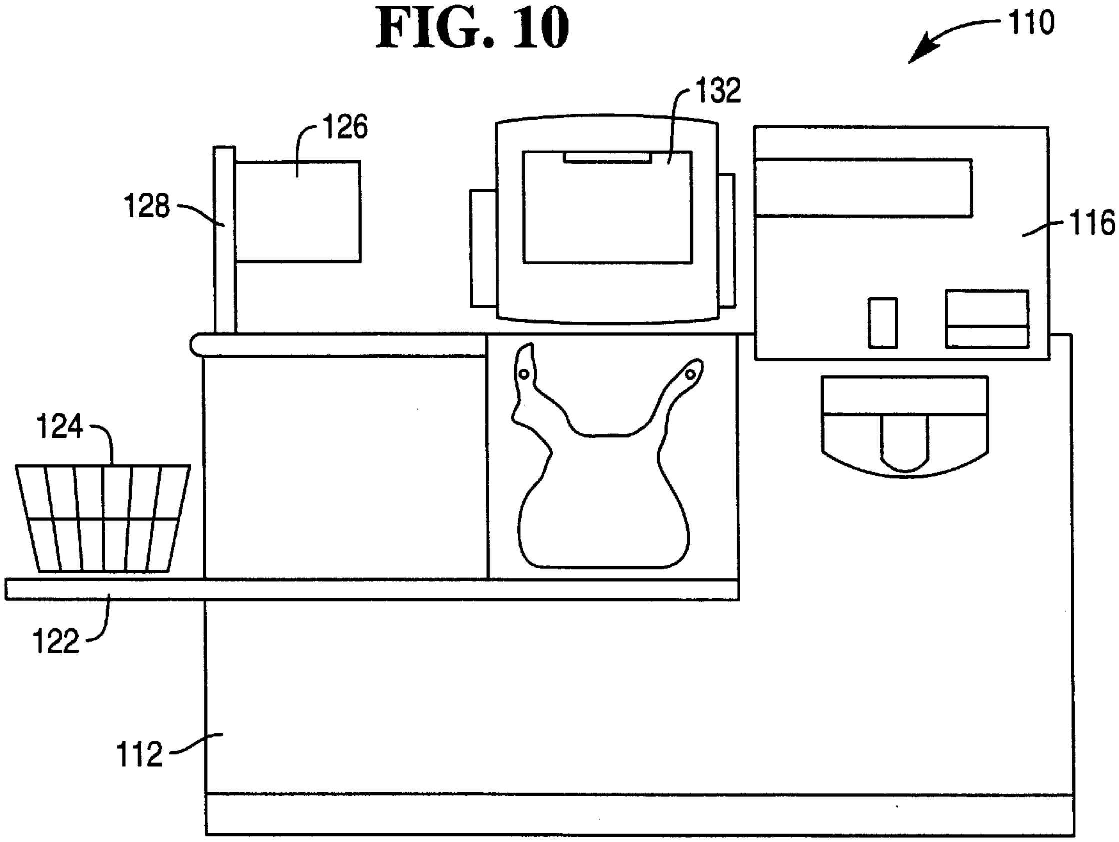
FIG. 10 is a front plan view of the checkout station of FIG. 8.
Figure 11:
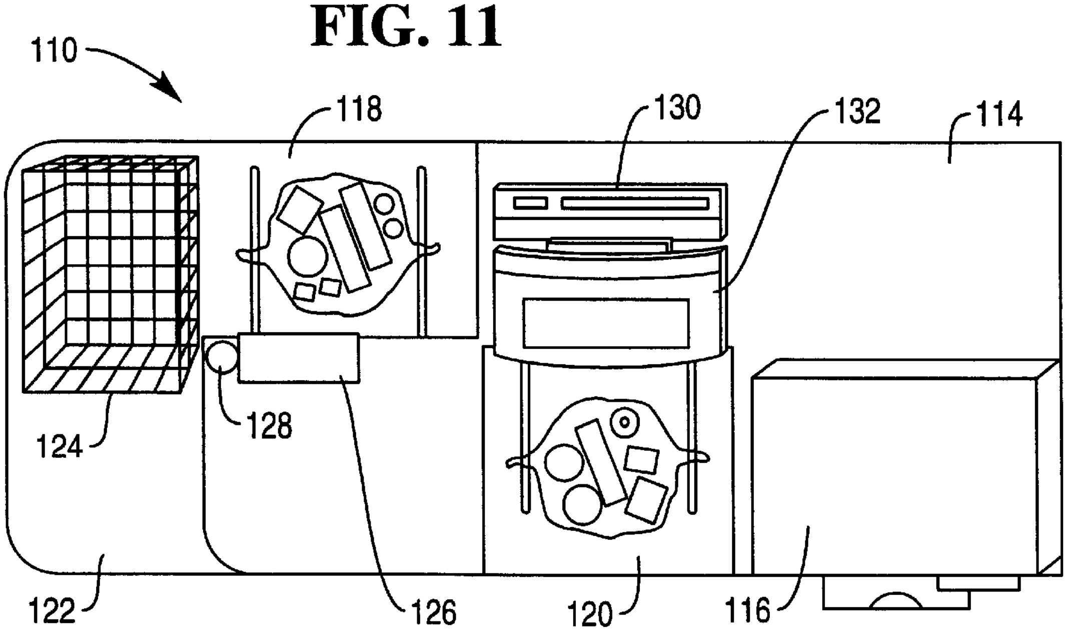
FIG. 11 is a top plan view of the checkout station of FIG. 8.

FIG. 7 illustrates two adjacent checkout stations 32 of a possible plurality of serially adjacent checkout stations that are oriented relative to each other in the present modified serial configuration. The checkout station 32 on the left side of FIG. 7 has been converted into the unassisted checkout mode in order to allow a customer 90 to perform self-checkout. The scanner 36 is oriented facing toward the customer 90 so that items on the shelf 38 can be presented across the scanner 36. The terminal display 34 has been oriented to present its display face to the customer 90 as well as slid back for proper viewing by the customer 90. This position also and allows access to the bag well 39.

During the self-checkout process, once the items have been scanned, displayed, and processed by the checkout station 32, the items are bagged in the bag well 39. When all of the items have been scanned and bagged, the customer 90 presents payment via the cash module 35 or the terminal display 34 depending on the mode of payment and the payment configuration of the terminal display 34 and the cash module 35.

The checkout station 32 on the right side of FIG. 7 is the same as the checkout station 32 on the left side of FIG. 7 with the exception of the mode into which it has been converted. The checkout station 32 on the right side has been converted into the assisted checkout mode in order for a cashier 100 to assist a customer 95. The scanner 36 is oriented facing toward the side of the cashier bag well 33 so that items on the shelf 38 can be presented across the scanner 36 by the cashier and then bagged in the bag well 33. The terminal display 34 has been oriented to present its display face to the cashier 100 as well as slid partially over the bag well 39 for proper viewing by the cashier 100.

During the assisted checkout process, once the items have been scanned, displayed, and processed by the checkout station 32, and the items have been bagged, the customer 95 presents payment via the cash module 35 or the terminal display 34 depending on the mode of payment and the payment configuration of the terminal display 34 and the cash module 35.

Referring to FIGS. 8–11, there is shown an embodiment of a checkout station, generally designated 110, in accordance with the principles presented herein. The checkout station 110 includes a configured housing 112 that supports a various-level counter 114. The various-level counter 114 supports/houses a cash module 116 having like features, characteristics, and/or functionality as those cash modules described above. A clerk bag well 118 is disposed on one side of the housing 112 while a customer bag well 120 is disposed on a side of the housing 112 opposite the clerk bag well 118. The clerk bag well 118 is utilized by a clerk when the checkout station 110 is in a clerk-assisted mode of operation, while the customer bag well 120 is utilized by a customer when the checkout station 110 is in a self-assisted mode of operation. Each bag well 118 and 120 incorporates the various features/characteristics/functionality as the bag wells previously discussed. Extending from an end of the checkout station 110 is a basket shelf 122 that is adapted to support/hold a shopping basket 124.

The checkout station 110 also includes a scanner 126 that is pivotally mounted on a post 128. The scanner 126 incorporates the same features, characteristics, and/or functionality as the scanners previously discussed. In addition, the scanner 126 is mounted to the post 128 such that the scanner 126 is movable between an assisted (clerk-assisted) mode of operation and a self-assisted mode of operation. The scanner 126 thus presents a scanning face to either the clerk or the customer depending on the mode of operation (i.e. position of the scanner 126).

The checkout station 110 further includes a clerk display 130 and a customer display 132. The clerk display 130 is oriented toward a clerk and includes various controls (e.g. keypad) that may be utilized by a clerk during the clerk-assisted mode of operation of the checkout station 110. The clerk display 130 may or may not be movable and/or foldable. The customer display 132 lacks controls like the clerk display 130, but is preferably movable. According to one aspect, the customer display 132 is movable (pivotal) between a display position as seen in the figures (typically when the checkout station 110 is in a self-assisted mode of operation) and a non-display position (typically when the checkout station 110 is in a clerk-assisted mode of operation). The customer display 132 is pivoted over the customer bag well 120 such that the back of the customer display 132 provides a cover or top to the bag well 120. The customer display 132 may also move in other manners.

Of course, it should be appreciated that the checkout station 110 includes other features, characteristics, and/or functionality typical of checkout stations described herein. For example, each bag well 118 and 120, or just the customer bag well 120 may include a scale to weigh items that are being bagged. Variations are also contemplated.

While the invention is susceptible to various modifications and alternative forms, the specific embodiment(s) shown and/or described herein is by way of example. It should thus be appreciated that there is no intent to limit the invention to the particular form disclosed, as the invention is to cover all modifications, equivalents, and alternatives falling within the spirit and scope of the invention as defined by the appended claims. Of course, variations to the above are contemplated. Additionally, the various angles of the checkout stations are approximate within the principles presented herein.

What is claimed is:

1. A checkout system, comprising:

a single serial flow lane;

a plurality of checkout stations disposed adjacent to said single serial flow lane, wherein each of said plurality of checkout stations is (i) operative to perform purchase transactions, and (ii) convertible between a self-checkout configuration and an assisted checkout configuration, and further wherein each of said plurality of checkout stations defines a customer side and a store personnel side; and a shelf interposed between each set of adjacent checkout stations of said plurality of checkout stations, said shelf being movable between (i) a first position in which said shelf creates a barrier between said store personnel side and said customer side, and (ii) a second position in which an access opening is created between said store personnel side and said customer side that allows passage from said store personnel side to said customer side, wherein the single serial flow lane defines a flow lane axis, wherein each of the plurality of checkout stations defines a checkout station orientation axis, and wherein each of the plurality of checkout stations are skewed relative to the single serial flow lane such that said flow lane axis and said checkout station orientation axis define an angle $\theta$, wherein $10° < \theta < 60°$.

2. The checkout system of claim 1, wherein:

said shelf defines a shelf orientation axis, and said shelf is positioned relative to the single serial flow lane such that said flow lane axis and said shelf axis are parallel to each other.

3. The checkout system of claim 1, wherein $20° < \theta < 40°$.

4. The checkout system of claim 3, wherein $\theta$ is equal to about 25°.

5. The checkout system of claim 1, wherein:

each of the plurality of checkout stations including a rotatable scanner, a customer display, and a clerk display, conversion of any one of the plurality of checkout stations between said self-checkout configuration and said assisted checkout configuration comprises rotating the rotatable scanner from a first location to a second location, and selective activation of said customer display and said clerk display.

6. The checkout system of claim 1, wherein each of said plurality of checkout stations is operative to receive payment for purchases performed during said purchase transactions.

7. A checkout system, comprising:

a single serial flow lane; and a plurality of checkout stations disposed adjacent to said single serial flow lane, each of said plurality of checkout stations being (i) operative to perform purchase transactions, and (ii) convertible between a self-checkout configuration and an assisted checkout configuration, wherein the single serial flow lane defines a flow lane axis, wherein each of the plurality of checkout stations defines a checkout station orientation axis, and wherein each of the plurality of checkout stations are skewed relative to the single serial flow lane such that said flow lane axis and said checkout station orientation axis define an angle $\theta$, and wherein $10° < \theta < 60°$.

8. The checkout system of claim 7, wherein:

a shelf defines a shelf orientation axis, and said shelf is positioned relative to the single serial flow lane such that said flow lane axis and said shelf axis are parallel to each other.

9. The checkout system of claim 7, wherein $20° < \theta < 40°$.

10. The checkout system of claim 9, wherein $\theta$ is equal to about 25°.

11. The checkout system of claim 7, wherein:

each of the plurality of checkout stations including a rotatable scanner, a customer display, and a clerk display, conversion of any one of the plurality of checkout stations between said self-checkout configuration and said assisted checkout configuration comprises rotating the rotatable scanner from a first location to a second location, and selective activation of said customer display and said clerk display.

12. The checkout system of claim 7, wherein each of said plurality of checkout stations is operative to receive payment for purchases performed during said purchase transactions.

13. The checkout system of claim 12, wherein each of said plurality of checkout stations is operative to receive payment for purchases performed during said purchase transactions.

14. A checkout system, comprising:

a single serial flow lane that defines a flow lane axis;

a plurality of checkout stations disposed adjacent to said single serial flow lane, wherein each of said plurality of checkout stations is operative to perform purchase transactions, and further wherein each of said plurality of checkout stations defines a customer side and a store personnel side; and a shelf interposed between each set of adjacent checkout stations of said plurality of checkout stations, wherein said shelf is movable between (i) a first position in which said shelf creates a barrier between said store personnel side and said customer side, and (ii) a second position in which an access opening is created between said store personnel side and said customer side that allows passage from said store personnel side to said customer side, and further wherein (i) said shelf defines a shelf orientation axis, and (ii) said shelf is positioned relative to the single serial flow lane such that said flow lane axis and said shelf axis are parallel to each other, wherein each of the plurality of checkout stations defines a checkout station orientation axis, and wherein each of the plurality of checkout stations are skewed relative to the single serial flow lane such that said flow lane axis and said checkout station orientation axis define an angle θ, wherein $10° < \theta < 60°$.

15. The checkout system of claim 14, wherein:

each of the plurality of checkout stations including a rotatable scanner, a customer display, and a clerk display, conversion of any one of the plurality of checkout stations between a self-checkout configuration and an assisted checkout configuration comprises rotating the rotatable scanner from a first location to a second location, and selective activation of said customer display and said clerk display.

16. The checkout system of claim 14, wherein $20° < \theta < 40°$.

17. The checkout system of claim 16, wherein θ is equal to about 25°.

18. A checkout system, comprising:

a single serial flow lane that a flow lane axis;

a plurality of checkout stations disposed adjacent to said single serial flow lane, wherein each of said plurality of checkout stations is operative to perform purchase transactions, and further wherein each of said plurality of checkout stations defines a customer side and a store personnel side; and a shelf interposed between each set of adjacent checkout stations of said plurality of checkout stations, wherein (i) said shelf defines a shelf orientation axis, and (ii) said shelf is positioned relative to the single serial flow lane such that said flow lane axis and said shelf axis are parallel to each other, wherein each of the plurality of checkout stations defines a checkout station orientation axis, and wherein each of the plurality of checkout stations are skewed relative to the single serial flow lane such that said flow lane axis and said checkout station orientation axis define an angle θ, wherein $10° < \theta < 60°$.

19. The checkout system of claim 18, wherein $20° < \theta < 40°$.

20. The checkout system of claim 18, wherein each of said plurality of checkout stations is operative to receive payment for purchases performed during said purchase transactions.

* * * * *